(12) United States Patent
Li

(10) Patent No.: US 10,429,578 B2
(45) Date of Patent: Oct. 1, 2019

(54) PLASTIC FRAME ASSEMBLY, BACKLIGHT SOURCE AND DISPLAY APPARATUS

(71) Applicants: BOE Technology Group Co., Ltd., Beijing (CN); BOE Optical Science and Technology Co. Ltd., Suzhou (CN)

(72) Inventor: Wenjun Li, Beijing (CN)

(73) Assignees: BOE TECHNOLOGY GROUP CO., LTD., Beijing (CN); BOE OPTICAL SCIENCE AND TECHNOLOGY CO., LTD., Suzhou (CN)

(*) Notice: Subject to any disclaimer, the term of this patent is extended or adjusted under 35 U.S.C. 154(b) by 0 days.

(21) Appl. No.: 15/501,215

(22) PCT Filed: Jul. 4, 2016

(86) PCT No.: PCT/CN2016/088346
§ 371 (c)(1),
(2) Date: Feb. 2, 2017

(87) PCT Pub. No.: WO2017/067217
PCT Pub. Date: Apr. 27, 2017

(65) Prior Publication Data
US 2018/0081108 A1    Mar. 22, 2018

(30) Foreign Application Priority Data

Oct. 23, 2015  (CN) .......................... 2015 1 0696360

(51) Int. Cl.
*F21V 8/00*     (2006.01)
*F21V 29/00*    (2015.01)
*F21V 19/00*    (2006.01)

(52) U.S. Cl.
CPC .............. *G02B 6/009* (2013.01); *F21V 19/00* (2013.01); *F21V 29/00* (2013.01); *G02B 6/0055* (2013.01);
(Continued)

(58) Field of Classification Search
CPC .... G02B 6/009; G02B 6/0055; G02B 6/0068; G02B 6/0085; G02B 6/0091; G02B 6/0081; F21V 19/00; F21V 29/00
See application file for complete search history.

(56) References Cited

U.S. PATENT DOCUMENTS 8,147,113 B2 * 4/2012 Hamada ............... G02B 6/0085
362/218
8,167,476 B2 * 5/2012 Sakamoto ............. G02B 6/009
362/249.02
(Continued)

FOREIGN PATENT DOCUMENTS

CN      102980147 A      3/2013
CN      103335253 A     10/2013
(Continued)

OTHER PUBLICATIONS

International Search Report and Written Opinion of International Application No. PCT/CN2016/088346, dated Sep. 1, 2016, 10 pages.
(Continued)

*Primary Examiner* — Anh T Mai
*Assistant Examiner* — Arman B Fallahkhair
(74) *Attorney, Agent, or Firm* — Westman, Champlin & Koehler, P.A.

(57) ABSTRACT

The present disclosure discloses a plastic frame assembly. In one embodiment, the plastic frame assembly includes a plastic frame and a heat-conducting component which are formed in an integrated structure; wherein, the plastic frame
(Continued)

includes an engagement structure configured to be engaged with an other component; and, the heat-conducting component includes a heat-conducting member and a plurality of protrusions protruded from a surface of the heat-conducting member, the protrusions being inserted into the plastic frame at the engagement structure thereof. The present disclosure also discloses a backlight source including this plastic frame assembly and a display apparatus including the abovementioned backlight source.

17 Claims, 5 Drawing Sheets

(52) U.S. Cl.
CPC .......... *G02B 6/0068* (2013.01); *G02B 6/0081* (2013.01); *G02B 6/0085* (2013.01); *G02B 6/0091* (2013.01)

(56) References Cited

U.S. PATENT DOCUMENTS

| | | | | |
|---|---|---|---|---|
| 8,253,886 | B2* | 8/2012 | Jeong | G02B 6/0091 349/58 |
| 8,531,624 | B2* | 9/2013 | Que | G02B 6/0086 349/58 |
| 8,767,140 | B2* | 7/2014 | He | G02B 6/0031 349/161 |
| 8,836,885 | B2* | 9/2014 | Yu | G02F 1/133308 349/58 |
| 9,164,226 | B2* | 10/2015 | Ishimoto | G02B 6/0085 |
| 9,250,471 | B2* | 2/2016 | Tokuyama | G02B 6/0073 |
| 2007/0064448 | A1* | 3/2007 | Yu | G02B 6/0065 362/633 |
| 2008/0180972 | A1 | 7/2008 | Sakamoto et al. | |
| 2011/0134346 | A1* | 6/2011 | Hayashi | G02F 1/133308 348/790 |
| 2015/0036381 | A1 | 2/2015 | Zhou | |
| 2016/0187568 | A1 | 6/2016 | Chen et al. | |
| 2017/0059137 | A1* | 3/2017 | Liu | G02F 1/133608 |

FOREIGN PATENT DOCUMENTS

| | | |
|---|---|---|
| CN | 103439831 A | 12/2013 |
| CN | 203364085 A | 12/2013 |
| CN | 104534359 A | 4/2015 |
| CN | 104595812 A | 5/2015 |
| CN | 104819438 A | 8/2015 |
| CN | 105180100 A | 12/2015 |
| JP | H11-133393 A | 5/1999 |
| JP | 2007-059231 A | 3/2007 |
| JP | 2015111205 A | 6/2015 |

OTHER PUBLICATIONS

English translation of Box No. V of the Written Opinion for the International Searching Authority for International Application No. PCT/CN2016/088346, 2 pages.
First Office Action from Chinese Patent Application No. 201510696360.4, dated Oct. 24, 2017, 17 pages.

\* cited by examiner

PLASTIC FRAME ASSEMBLY, BACKLIGHT SOURCE AND DISPLAY APPARATUS

CROSS-REFERENCE TO RELATED APPLICATION

This application is a 371 National Stage application of PCT/CN2016/088346, filed on Jul. 4, 2016, which has not yet published, entitled "Plastic Frame Assembly, Backlight Source And Display Apparatus, and claims priority to Chinese Patent Application No. 201510696360.4 filed on Oct. 23, 2015 in the State Intellectual Property Office of China, the disclosures of which are incorporated herein by reference in their entirety.

BACKGROUND

1. Technical Field

The present disclosure relates to the field of display technology, and particularly to a plastic frame assembly, a backlight source and a display apparatus which have good heat dissipating properties.

2. Description of the Related Art

With the rapid development of intelligent mobile phones, requirements on backlight module's performance in the market meet increasingly high demand. For example, a backlight module is required to have greater brightness and greater resolution. However, a great brightness light emitting diode (LED) leads to a local heat radiating problem of the backlight source. When an LED with the brightness of greater than 8 lm (lumens) is lighted up at the rated current, local temperature of the LED gradually increases with time. After running a certain time from the LED's lighting up, local temperature of the LED will be higher than 55 degrees Celsius. Once it is higher than this temperature, irreversible warp deformations will occur on light guide plate and reflecting sheet which are in tight contact with the LED. Moreover, since there are a number of the LEDs, the more the additional heat accumulation causes further adverse deformation. As a result, this problem also directly restricts arrangement of these LEDs in an LED lamp strip. In addition, the abovementioned heat dissipation problem also will directly adversely affect service life of the backlight source.

SUMMARY

According to one aspect of the present disclosure, there is provided a plastic frame assembly, comprising a plastic frame and a heat-conducting component which are formed in an integrated structure; wherein, the plastic frame comprises an engagement structure configured to be engaged with an other component; and, the heat-conducting component comprises a heat-conducting member and a plurality of protrusions protruded from a surface of the heat-conducting member, the protrusions being inserted into the plastic frame at the engagement structure thereof.

In one embodiment, the heat-conducting component further comprises a plurality of through holes formed in the surface of the heat-conducting member, and, at least one of the through holes is formed between two adjacent ones of the protrusions.

In one embodiment, a thickness of the heat-conducting member is 0.1 mm-0.2 mm.

In one embodiment, a depth of insertion of the protrusion into the plastic frame meets the following relationship: $\frac{1}{3}h2 \leq h1 \leq h2$; in which, h1 is the depth of insertion of the protrusion into the plastic frame, and, h2 is a thickness of the engagement structure of the plastic frame.

In one embodiment, a width of the protrusion meets the following relationship: $W1 \leq W2$; in which, W1 is the width of the protrusion, and, W2 is a width of the engagement structure of the plastic frame.

In one embodiment, a distance between two adjacent ones of the protrusions meets the following relationship: 3.2 mm<K1<7.6 mm; in which, K1 is the distance between two adjacent ones of the protrusions.

In one embodiment, a diameter of the through hole meets the following relationship: $0.4 \text{ mm} \leq \phi \leq 1.0 \text{ mm}$; in which, $\phi$ is the diameter of the through hole.

In one embodiment, the number of the through hole(s) formed between two adjacent ones of the protrusions is one, two or more.

In one embodiment, the number of the through hole(s) between two adjacent ones of the protrusions is two or more, and, a distance between two adjacent ones of the through holes formed between two adjacent ones of the protrusions meets the following relationship: $\frac{1}{4}K1 < K2 < \frac{1}{2}K1$; in which, K1 is a distance between two adjacent ones of the protrusions, and K2 is the distance between two adjacent ones of the through holes formed between two adjacent ones of the protrusions.

In one embodiment, material for the heat-conducting component comprises iron, steel or aluminum.

In one embodiment, the through hole of the heat-conducting component is formed close to an edge of the heat-conducting member.

According to another aspect of the present disclosure, there is provided a backlight source comprising: a plastic frame assembly according to any one of the abovementioned aspects or embodiments, and a LED lamp strip connected to the plastic frame assembly through a lamp strip adhesive.

In one embodiment, the through hole of the heat-conducting component is formed close to an edge of the heat-conducting member, and, a distance A1 of a center of the through hole from the edge of the heat-conducting member is designed such that the through hole is located inside a projection of a LED of the LED lamp strip onto the heat-conducting component when the LED lamp strip is assembled onto the plastic frame assembly.

In one embodiment, the number of the protrusions of the heat-conducting component is N+1, where N is the number of LEDs in the LED lamp strip; and, one LED is disposed between every two adjacent ones of the protrusions.

In one embodiment, the number of the protrusions of the heat-conducting component is N+1, where N is the number of the LEDs in the LED lamp strip; and, one LED is disposed between every two adjacent ones of the protrusions.

In one embodiment, the number of the through holes of the heat-conducting component is an integer multiple of N, where N is the number of LEDs in the LED lamp strip.

According to yet another aspect of the present disclosure, there is provided a display apparatus comprising a backlight source according to any one of the abovementioned aspects or embodiments.

Other objects and advantages of the present disclosure will become apparent and more readily appreciated from the following description of the present disclosure, taken in conjunction with the accompanying drawings.

DETAILED DESCRIPTION OF THE EMBODIMENTS

Figure 1:
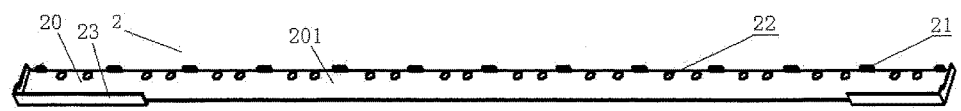
FIG. 1 is a perspective view of a heat-conducting component according to an embodiment of the present disclosure.

Technical solutions of the present disclosure will be further described hereinafter in detail in conjunction with these embodiments and with reference to the attached drawings. In this description, the like or similar reference numerals refer to the like or similar elements. These embodiments of the present disclosure with reference to the attached drawings are provided so that generally concept of the present invention will be thorough and complete, and should not be construed as limiting the present invention.

In addition, in the following detailed description, a lot of specific details are expounded to provide a complete understanding on these embodiments of the present disclosure. However, obviously, one or more embodiments can be implemented without involving these specific details. In other situations, well-known structures and devices are presented illustratively in order to simplify the drawings.

According to one aspect of a generally technical concept of the present disclosure, there is provided a plastic frame assembly comprising a plastic frame and a heat-conducting component which are formed in an integrated structure; wherein, the plastic frame comprises an engagement structure configured to be engaged with an other component; and, the heat-conducting component comprises a heat-conducting member and a plurality of protrusions protruded from a surface of the heat-conducting member, the protrusions being inserted into the plastic frame at the engagement structure thereof. Accordingly, the plastic frame and the heat-conducting component are formed in an integrated structure (for example, the plastic frame and the iron heat-conducting component are formed in a plastic-iron integrated structure), the protrusions are formed at a location of the heat-conducting component corresponding to the engagement structure of the plastic frame, and, heat dissipating fin-like structure is formed between the plurality of LEDs, to increase heat dissipating area and enhance heat transfer property.

According to another aspect of a generally technical concept of the present disclosure, there is provided a backlight source comprising this plastic frame assembly.

Figure 2:
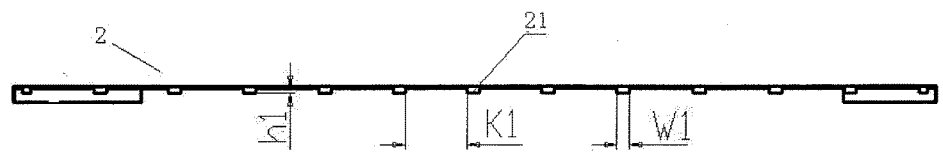
FIG. 2 is a front view of the heat-conducting component according to the embodiment of the present disclosure.
Figure 3:
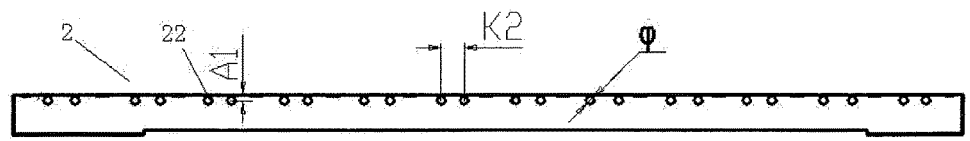
FIG. 3 is a top view of the heat-conducting component according to the embodiment of the present disclosure.
Figure 4:
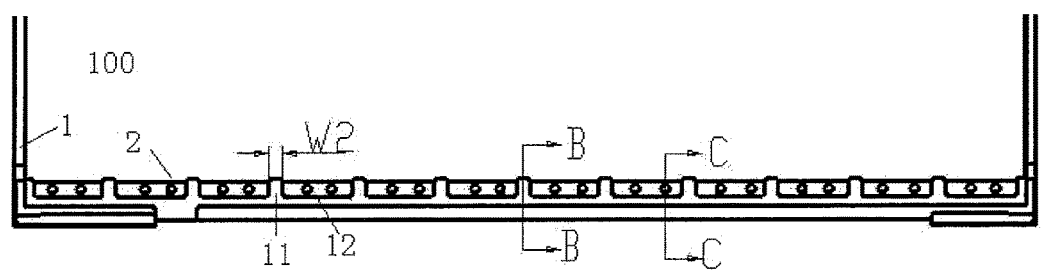
FIG. 4 is a schematic view of a plastic frame assembly according to an embodiment of the present disclosure.

FIGS. 1-3 are a perspective view, a front view and a top view of a heat-conducting component 2 according to an embodiment of the present disclosure, respectively, and, FIG. 4 is a schematic view of a plastic frame assembly 100 according to an embodiment of the present disclosure.

Referring to FIG. 4, the plastic frame assembly 100 comprises a plastic frame 1 and a heat-conducting component 2. The plastic frame 1 is a commonly used element in a display screen, and it is a kind of support frame which can be used for fixations of films, PCBA (Printed Circuit Board Assembly), light-guiding plates and/or supports of FOG (Film On Glass) or panels. The plastic frame 1 comprises an engagement structure configured to be engaged with an other component (for example, a component to be fixed and/or supported by the plastic frame). Generally, the engagement structure comprises a continuous concave-convex structure, for example, the convex portions 11 and the concave portions 12 shown in FIG. 4. In the art, such a continuous concave-convex structure is also named as "castle structure" or "great wall slots".

Referring back to FIGS. 1-3, in the shown embodiment, the heat-conducting component 2 comprises a heat-conducting member 20, which may be a sheet-shaped element having a surface 201, as being shown in figure. In some embodiments, a thickness of the heat-conducting member 20 is in a range of 0.1 mm-0.2 mm. If the thickness of the heat-conducting member 20 is greater than 0.2 mm, then it will result in the whole heat-conducting member 20 has a higher weight, and thus cause a greater weight of the whole plastic frame assembly, thereby counting against thinning and lightweight of the display panel. If the thickness of the heat-conducting member 20 is less than 0.1 mm, then it will adversely affect heat dissipating effect of the heat-conducting component 20.

Referring to FIG. 1, the heat-conducting component 2 further comprises protrusions 21 (also being named as "gripping structure") and through holes 22, wherein, a plurality of protrusions 21 are protruded from the surface 201, and, a plurality of through holes 22 are formed on the surface 201. In the shown embodiment, disposed in either side of the heat-conducting member 20 is an L-shaped flanged structure 23.

In the shown embodiment, two through holes 22 are formed between two adjacent protrusions 21. In other embodiments, one, three or more through holes 22 may also be formed between two adjacent protrusions 21. In one embodiment, the number of the through holes 22 formed between two adjacent protrusions 21 may be two or more, and, a distance between two adjacent through holes 22 formed between two adjacent protrusions 21 meets the following relationship: ¼K1<K2<½K1; in which, K1 is the distance between two adjacent protrusions, and K2 is the distance between two adjacent through holes formed between two adjacent protrusions (as shown in FIG. 2 and FIG. 3).

Figure 5:
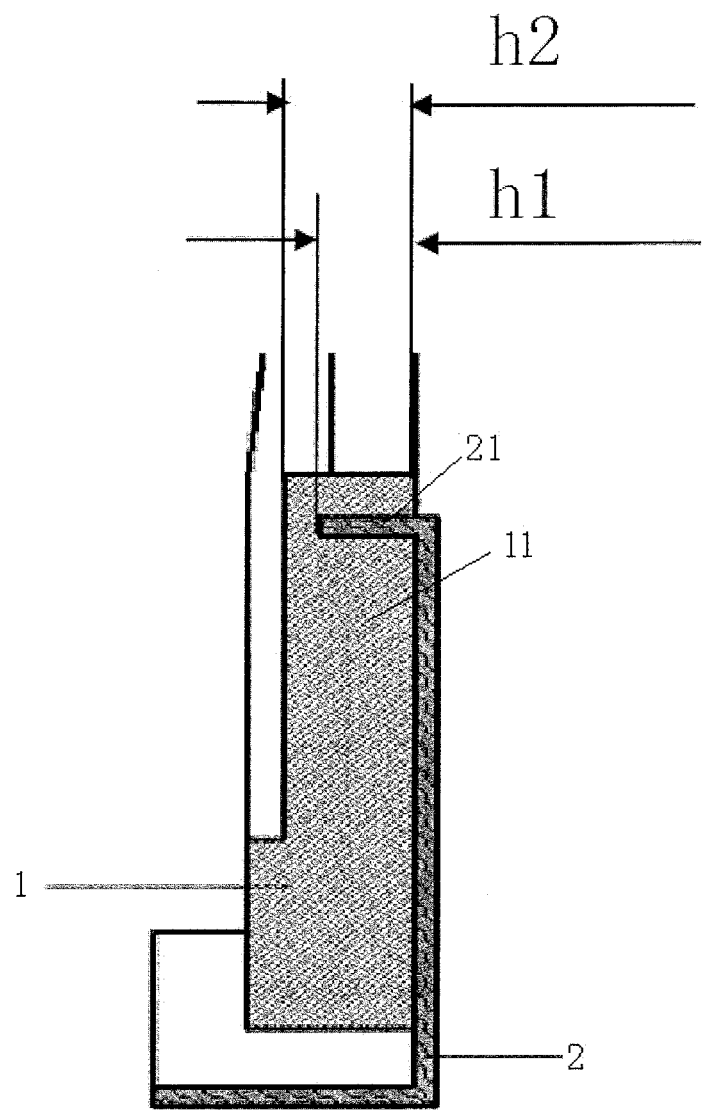
FIG. 5 is a sectional view of the plastic frame assembly according to the embodiment of the present disclosure, taken along a line B-B in FIG. 4.
Figure 6:
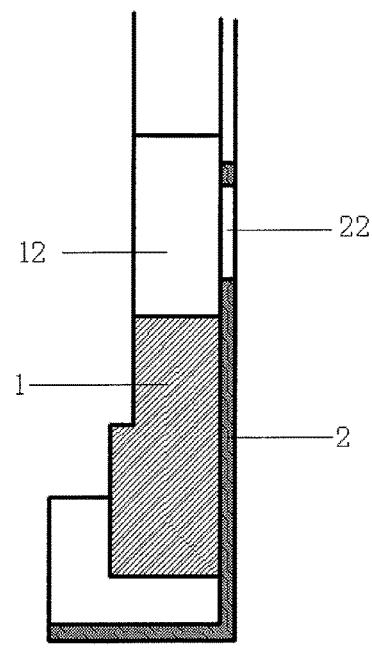
FIG. 6 is a sectional view of the plastic frame assembly according to the embodiment of the present disclosure, taken along a line C-C in FIG. 4.

FIG. 5 and FIG. 6 are sectional views of the plastic frame assembly according to the embodiment of the present disclosure, taken along lines B-B and C-C in FIG. 4, respectively. As shown in FIG. 5, the protrusions 21 of the heat-conducting component 2 are inserted into the plastic frame 1 at the convex portions 11 of the engagement structure of the plastic frame 1. Specifically, during manufacturing, the heat-conducting component 2 made of heat-conducting materials including iron, steel or aluminum and the likes is placed entirely in a mold, for injection molding of the plastic frame 1. As a result, the plastic frame 1 and the heat-conducting component 2 are formed in an integrated structure, and, the protrusions 21 of the heat-conducting component 2 are inserted into the plastic frame 1 at the engagement structure of the plastic frame 1. In some embodiments, adhesion of the heat-conducting component 2 to the plastic frame 1 is strengthened through the flanged structure 23 shown in FIG. 1. In some embodiments, a plurality of auxiliary holes (not shown in figures) may also be provided on the flanged structure 23, to further strengthen adhesion and fixation of the heat-conducting component 2 to the plastic frame 1. Referring to FIG. 5, depth of the insertion of the protrusion 21 into the plastic frame 1 mainly depends on thickness of the convex portion 11 of the engagement structure of the plastic frame 1. In some embodiments, a depth of the insertion of the protrusion 21 into the plastic frame 1 meets the following relationship: ⅓h2≤h1≤h2; in which, h1 is the depth of the insertion of the protrusion into the plastic frame, and, h2 is a thickness of the convex portion 11 of the engagement structure of the plastic frame. If h1<⅓h2, it means that the depth of the insertion of the protrusion 21 into the plastic frame 1 is not enough, which will lead into adhesion of the heat-conducting component 2 to the plastic frame 1 unstable. If h1>h2, it means that the protrusion 21 is inserted through the engagement structure of the plastic frame 1 in thickness, which will obstruct arrangements of other components in the plastic frame 1. In some embodiments, a width of the protrusion 21 meets the following relationship: W1≤W2; in which, W1 is the width of the protrusion (as shown in FIG. 2), and, W2 is a width of the convex portion 11 of the engagement structure of the plastic frame 1 (as shown in FIG. 4). Meanwhile, referring to FIG. 6, when the plastic frame 1 and the heat-conducting component 2 are formed in an integrated structure, through holes 22 of the heat-conducting component 2 are exposed at the concave portions 12 of the engagement structure of the plastic frame 1.

Figure 7:
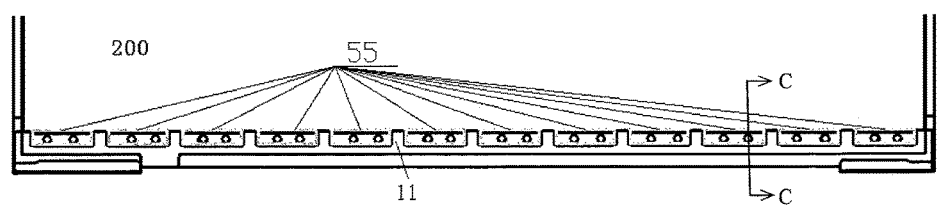
FIG. 7 is a partially sectional view of a structure of a backlight source according to an embodiment of the present disclosure.
Figure 8:
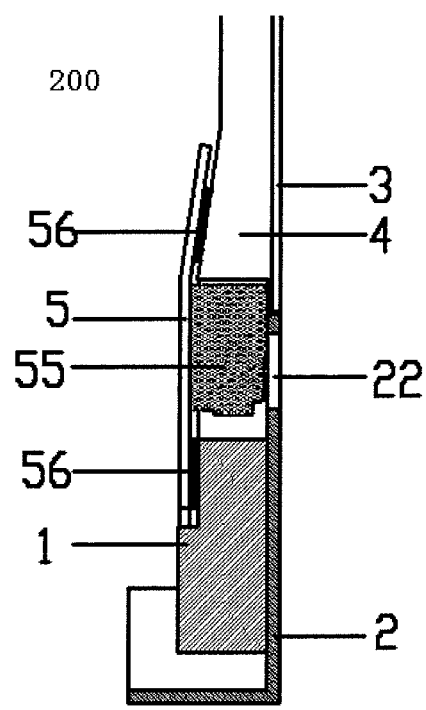
FIG. 8 is a sectional view of the structure of the backlight source according to the embodiment of the present disclosure, taken along a line C-C in FIG. 7.

FIG. 7 is a partial schematic view of a structure of a backlight source 200 according to an embodiment of the present disclosure; and, FIG. 8 is a sectional view of the structure of the backlight source 200 according to the embodiment of the present disclosure, taken along a line C-C in FIG. 7. Referring to FIG. 7, the structure of the backlight source 200 comprises the abovementioned plastic frame assembly 100 and a plurality of LEDs 55. In some embodiments, referring to FIG. 8, the structure of the backlight source 200 comprises the plastic frame 1, the heat-conducting component 2, a LED lamp strip consisting of a plurality of LEDs 55, a reflecting sheet 3, a light-guiding plate 4 and a flexible printed circuit (FPC) 5, and, the LED lamp strip is connected to the plastic frame 1 of the plastic frame assembly and/or the light-guiding plate 4, by lamp strip adhesive 56.

Referring to FIG. 7, the plurality of LEDs 55 are placed between any two adjacent convex portions 11 of the engagement structure of the plastic frame 1, respectively. Referring to FIG. 8, the through hole 22 of the heat-conducting component 2 is located inside a projection of the LED 55 onto the heat-conducting component 2 after the structure of the backlight source is assembled. In this way, on one hand, the heat-conducting component 2, by means of the insertion of the protrusion 21 into the convex portion 11 of the plastic frame 1, has increased heat dissipating area, so that the carrier (namely the plastic frame 1) for LED lamp strip has enhanced heat transfer property. On the other hand, location of the through hole 22 inside the projection of the LED 55 onto the heat-conducting component 2 promotes circulation of the air around the LED 55, so that heat generated at the LED will be brought away immediately by the air circulation, thereby further improving heat dissipating effect.

Referring to FIG. 7 and FIG. 8, the number of the protrusion(s) 21 and the number of the through hole(s) 22 depend on the number of the LED(s) in the LED lamp strip. In the shown embodiment, the number of the protrusion(s) 21 is n1=N+1, and, the number of the through hole(s) 22 is n2=2*N, in which, N is the number of the LED(s) in the LED lamp strip required to be mounted. In other embodiments, the number n2 of the through hole(s) 22 may be any other integer multiple of N, and, sizes of the protrusion(s) 21 and the through hole(s) 22 depend on size of the LED(s).

In order to dispose one LED 55 between two adjacent convex portions 11 (that is, two adjacent protrusions 21), a distance between the two adjacent protrusions 21 is preferably provided so that it is greater than a length of one LED 55 but is less than a sum of lengths of two LEDs 55. In practical, a distance K1 between two adjacent protrusions 21 meets the following relationship: 3.2 mm<K1<7.6 mm.

In order to ensure that the through hole 22 is located inside a projection of the LED 55 onto the heat-conducting component 2 when the structure of the backlight source is assembled, the through hole 22 of the heat-conducting component 2 is formed close to an edge of the heat-conducting member 20, as shown in FIG. 3. And, a distance A1 of a center of the through hole 22 from the edge of the heat-conducting member 20 is designed such that the through hole is located inside a projection of the LED 55 onto the heat-conducting component 2 when the LED lamp strip is assembled onto the plastic frame assembly. In some embodiments, when the LED lamp strip is assembled, the through hole 22 should be located inside a projection of the LED onto the heat-conducting component 2 but does not go beyond the width of the LED. Accordingly, in practical, a diameter φ of the through hole meets the following relationship: 0.4 mm≤φ≤1.0 mm (width of the LED). If the diameter φ of the through hole is undersized, circulation of the air around the LED is not enough and the heat dissipation is not performed to the greatest extent. If the diameter φ of the through hole is oversized, it goes beyond the width of the LED, and the number of the through holes formed between two adjacent protrusions 21 is limited, which will also restrict heat dissipating effect of the through holes.

According to another aspect of a generally technical concept of the present disclosure, there is further provided a display apparatus comprising the backlight source according to any one of the abovementioned embodiments. The display apparatus may be a liquid crystal display apparatus.

The plastic frame assembly, the backlight source including the plastic frame assembly, and the display apparatus including the backlight source according to the above embodiments have the following advantageous. The plastic frame and the heat-conducting component are formed in an integrated structure (for example, the plastic frame and the iron heat-conducting component are formed in a plastic-iron integrated structure), the protrusions are formed at a location of the heat-conducting component corresponding to the engagement structure of the plastic frame, and, heat dissipating fin-like structure is formed between the plurality of LEDs, to increase heat dissipating area and enhance heat transfer property.

Although embodiments of the present disclosure have been shown and described with reference to the attached drawings, these embodiments illustrated in the attached drawings are used to illustrate preferable embodiments of the present disclosure, but not to limit the present disclosure.

Although several embodiments according to the present invention have been shown and described, it would be appreciated by those skilled in the art that various changes may be made in these embodiments without departing from the principles and spirit of the present invention, the scope of which is defined in the claims and their equivalents.

The invention claimed is:

1. A backlight source comprising: a plastic frame assembly, and a LED lamp strip connected to the plastic frame assembly through a lamp strip adhesive, wherein the plastic frame assembly comprises a plastic frame and a heat-conducting component which are connected with each other to result in an integrated structure; wherein, the plastic frame comprises an engagement structure comprising convex portions and concave portions alternately provided with one another; and, the heat-conducting component comprises a heat-conducting member and a plurality of protrusions protruded from a surface of the heat-conducting member, the protrusions being inserted into the plastic frame at the engagement structure thereof, wherein, the heat-conducting component further comprises a plurality of heat dissipation-purposed through holes formed in the heat-conducting member; and, the through holes are exposed in the concave portions of the engagement structure, respectively, to form a plurality of heat dissipation-purposed hollow passages in the plastic frame assembly; wherein the LED lamp strip is disposed inside each of the concave portions of the engagement structure, and, each of the through holes is located inside a projection of the corresponding LED lamp strip onto the heat-conducting component.

2. The backlight source of claim 1, wherein at least one of the through holes is formed between two adjacent ones of the protrusions; wherein, the through hole of the heat-conducting component is formed close to an edge of the heat-conducting member, and, a distance A1 of a center of the through hole from the edge of the heat-conducting member is designed such that the through hole is located adjacent an LED of the LED lamp strip when the LED lamp strip is assembled onto the plastic frame assembly.

3. The backlight source of claim 2, wherein, the number of the protrusions of the heat-conducting component is N+1, where N is the number of the LEDs in the LED lamp strip; and, one LED is disposed between every two adjacent ones of the protrusions.

4. The backlight source of claim 3, wherein, the number of the through holes of the heat-conducting component is an integer multiple of N, where N is the number of LEDs in the LED lamp strip.

5. The backlight source of claim 2, wherein, the number of the through holes of the heat-conducting component is an integer multiple of N, where N is the number of LEDs in the LED lamp strip.

6. The backlight source of claim 2, wherein, a diameter of the through hole meets the following relationship: 0.4 mm≤φ≤1.0 mm;

in which, φ is the diameter of the through hole.

7. The backlight source of claim 2, wherein, the number of the through hole(s) formed between two adjacent ones of the protrusions is one, two or more.

8. The backlight source of claim 2, wherein, the number of the through hole(s) between two adjacent ones of the protrusions is two or more, and, a distance between two adjacent ones of the through holes formed between two adjacent ones of the protrusions meets the following relationship: ¼K1<K2<½K1;

in which, K1 is a distance between two adjacent ones of the protrusions, and K2 is the distance between two adjacent ones of the through holes formed between two adjacent ones of the protrusions.

9. The backlight source of claim 2, wherein, material for the heat-conducting component comprises iron, steel or aluminum.

10. The backlight source of claim 1, wherein, the number of the protrusions of the heat-conducting component is N+1, where N is the number of LEDs in the LED lamp strip; and, one LED is disposed between every two adjacent ones of the protrusions.

11. The backlight source of claim 10, wherein, the number of the through holes of the heat-conducting component is an integer multiple of N, where N is the number of LEDs in the LED lamp strip.

12. The backlight source of claim 1, wherein, the number of the through holes of the heat-conducting component is an integer multiple of N, where N is the number of LEDs in the LED lamp strip.

13. A display apparatus comprising a backlight source of claim 1.

14. The backlight source of claim 1, wherein, a thickness of the heat-conducting member is in a range of 0.1 mm-0.2 mm.

15. The backlight source of claim 1, wherein, a depth of insertion of the protrusion into the plastic frame meets the following relationship: ⅓h2≤h1≤h2;

in which, h1 is the depth of insertion of the protrusion into the plastic frame, and, h2 is a thickness of the engagement structure of the plastic frame.

16. The backlight source of claim 1, wherein, a width of the protrusion meets the following relationship: W1≤W2;

in which, W1 is the width of the protrusion, and, W2 is a width of the convex portion of the plastic frame.

17. The backlight source of claim 1, wherein, a distance between two adjacent ones of the protrusions meets the following relationship: 3.2 mm<K1<7.6 mm;

in which, K1 is the distance between two adjacent ones of the protrusions.

* * * * *